(12) United States Patent
Meltser et al.

(10) Patent No.: US 12,418,393 B2
(45) Date of Patent: Sep. 16, 2025

(54) POWER STATE MANAGEMENT FOR FABRICS

(71) Applicant: MELLANOX TECHNOLOGIES, LTD., Yokneam (IL)

(72) Inventors: Roman Meltser, Atlit (IL); Guy Lederman, Ness Ziona (IL); Ran Ravid, Tel Aviv (IL); Zvi Rechtman, Petah Tikva (IL); Lavi Koch, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 407 days.

(21) Appl. No.: 17/994,326

(22) Filed: Nov. 27, 2022

(65) Prior Publication Data

US 2024/0039689 A1 Feb. 1, 2024

Related U.S. Application Data

(60) Provisional application No. 63/392,879, filed on Jul. 28, 2022.

(51) Int. Cl.
*H04L 7/02* (2006.01)
(52) U.S. Cl.
CPC .................................. *H04L 7/02* (2013.01)
(58) Field of Classification Search
CPC ........................................................ H04L 7/02
See application file for complete search history.

(56) References Cited

U.S. PATENT DOCUMENTS

| | | | |
|---|---|---|---|
| 9,106,387 B2 | 8/2015 | Goldenberg et al. | |
| 10,412,673 B2 | 9/2019 | Levy et al. | |
| 11,190,191 B2 | 11/2021 | Wolkovitz et al. | |
| 11,424,968 B1 | 8/2022 | Sun et al. | |
| 2014/0241411 A1 | 8/2014 | Ghiasi | |
| 2017/0017604 A1 | 1/2017 | Chen et al. | |
| 2017/0185502 A1 | 6/2017 | Iyer et al. | |
| 2018/0181502 A1 | 6/2018 | Jen et al. | |
| 2018/0227149 A1 | 8/2018 | Johnson | |
| 2018/0253398 A1* | 9/2018 | Wu | G06F 15/173 |
| 2018/0331864 A1 | 11/2018 | Das Sharma | |

(Continued)

OTHER PUBLICATIONS

Rechtman et al., U.S. Appl. No. 18/174,701, filed Feb. 27, 2023.

(Continued)

*Primary Examiner* — Duc C Ho
(74) *Attorney, Agent, or Firm* — Meitar Patents Ltd.; Daniel Kligler

(57) ABSTRACT

In one embodiment, a retimer device includes a receiver to receive data from a first device via a data link, retimer circuitry to recover a clock phase from the received data, and prepare a new copy of the received data sampled by a clean clock based on the recovered clock phase, a transmitter to transmit the new copy to a second device via the data link, wherein the receiver is configured to receive an in-band standby signal from the first device having a given pattern in a physical layer of the signal, activate a power saving mode of the retimer device responsively to the standby signal having the given pattern in the physical layer of the standby signal, receive an in-band wakeup signal from the first device, and initiate an exit from the power saving mode to power up the retimer device responsively to the wakeup signal.

26 Claims, 4 Drawing Sheets

(56) References Cited

U.S. PATENT DOCUMENTS

| | | |
|---|---|---|
| 2019/0104057 A1 | 4/2019 | Goel et al. |
| 2019/0340146 A1* | 11/2019 | Chen .................... H03K 5/2481 |
| 2019/0386851 A1 | 12/2019 | Dai et al. |
| 2020/0280428 A1* | 9/2020 | Kovacs ................ H04L 5/1438 |
| 2022/0350713 A1 | 11/2022 | Mula et al. |
| 2023/0050128 A1 | 2/2023 | Razavi Majomard et al. |

OTHER PUBLICATIONS

Infiniband Trade Association, "InfiniBand™ Architecture Specification", vol. 1, Release 1.3, pp. 1-1842, Mar. 3, 2015.

"IEEE Standard for Ethernet: Amendment 3: Media Access Control Parameters for 50 GB/s and Physical Layers and Management Parameters for 50 GB/s, 100 GB/s, and 200 GB/s Operation", IEEE Std 802.3cd™-2018, pp. 1-40, Dec. 5, 2018.

U.S. Appl. No. 18/174,701 office action dated Aug. 1, 2025.

* cited by examiner

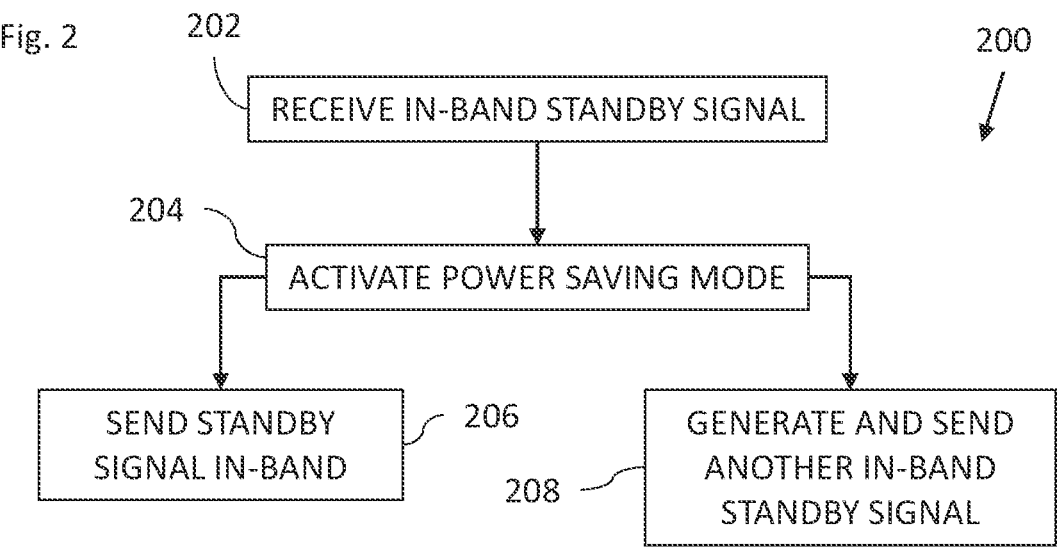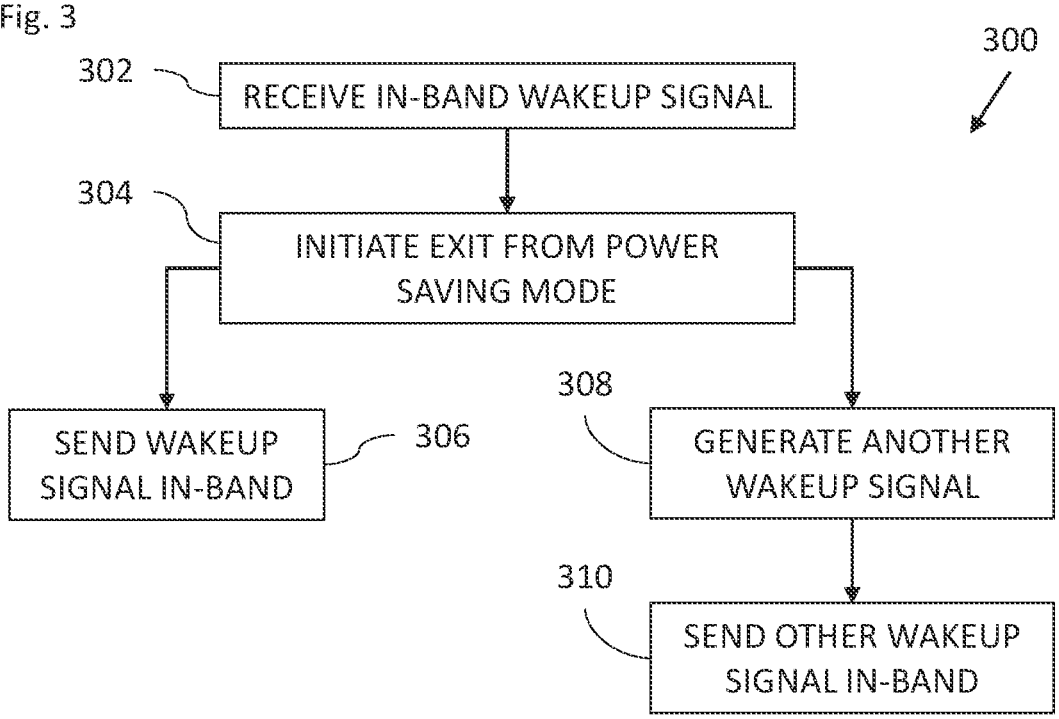

POWER STATE MANAGEMENT FOR FABRICS

RELATED APPLICATION INFORMATION

The present application claims benefit of U.S. Provisional Patent Application Ser. 63/392,879 of Meltser, et al., filed 28 Jul. 2022, the disclosure of which is hereby incorporated herein by reference.

FIELD OF THE INVENTION

The present invention relates to computers, and in particular, but not exclusively to, power state management in links.

BACKGROUND

Power state management is used to save power in networks and connections between devices. For example, two devices either side of a passive link may perform a handshake to go into a power saving mode (e.g., L1 power saving mode) to save energy when the link is not actively being used to transfer packets or other data. Power state management may also be used to throttle performance to other chip computation engines by maintaining a constrained thermal envelope.

SUMMARY

There is provided in accordance with an embodiment of the present disclosure, a retimer device, including a receiver to receive data from a first device via a data link, retimer circuitry to recover a clock phase from the received data, and prepare for transmission a new copy of the received data sampled by a clean clock based on the recovered clock phase, a transmitter to transmit the new copy of the received data to a second device via the data link, wherein the receiver is configured to receive an in-band standby signal from the first device having a given pattern in a physical layer of the signal, activate a power saving mode of the retimer device so that at least some of the retimer device is powered down responsively to the standby signal having the given pattern in the physical layer of the standby signal, receive an in-band wakeup signal from the first device, and initiate an exit from the power saving mode to power up the retimer device responsively to the wakeup signal.

Further in accordance with an embodiment of the present disclosure the receiver is configured to activate the power saving mode of the retimer circuitry so that the retimer circuitry is powered down responsively to the in-band standby signal, and initiate an exit from the power saving mode to power up the retimer circuitry responsively to the wakeup signal.

Still further in accordance with an embodiment of the present disclosure the receiver recognizes the given pattern in the standby signal in a physical media attachment sub layer without needing to use a physical coding sub layer.

Additionally in accordance with an embodiment of the present disclosure the transmitter is configured to send another given pattern in the physical layer of another in-band standby signal to the second device to activate a power saving mode in the second device.

Moreover, in accordance with an embodiment of the present disclosure the transmitter is configured to send the wakeup signal in-band to the second device responsively to receiving the wakeup signal from the first device.

Further in accordance with an embodiment of the present disclosure the transmitter is configured to send the wakeup signal to the second device prior to, or while, the retimer device is powering up from the power saving mode.

Still further in accordance with an embodiment of the present disclosure the transmitter is configured to generate another wakeup signal and send the other wakeup signal in-band to the second device responsively to receiving the wakeup signal from the first device.

Additionally in accordance with an embodiment of the present disclosure the data link includes an electrical signal data link.

Moreover, in accordance with an embodiment of the present disclosure the data link includes an optical signal data link.

Further in accordance with an embodiment of the present disclosure the first device is an end device, and the second device is an end device.

Still further in accordance with an embodiment of the present disclosure the first device is a retimer device and the second device is an end device.

Additionally in accordance with an embodiment of the present disclosure the first device is an end device, and the second device is a retimer device.

Moreover, in accordance with an embodiment of the present disclosure the first device is a retimer device and the second device is a retimer device.

There is also provided in accordance with another embodiment of the present disclosure, a retimer device power saving mode method, including receiving data from a first device via a data link, recovering a clock phase from the received data, preparing for transmission a new copy of the received data sampled by a clean clock based on the recovered clock phase, transmitting the new copy of the received data to a second device via the data link, receiving an in-band standby signal from the first device having a given pattern in a physical layer of the signal, activating a power saving mode of a retimer device so that at least some of the retimer device is powered down responsively to the standby signal having the given pattern in the physical layer of the standby signal, receiving an in-band wakeup signal from the first device, and initiating an exit from the power saving mode to power up the retimer device responsively to the wakeup signal.

Further in accordance with an embodiment of the present disclosure the activating includes activating the power saving mode of retimer circuitry so that the retimer circuitry is powered down responsively to the in-band standby signal, and initiating an exit from the power saving mode to power up the retimer circuitry responsively to the wakeup signal.

Still further in accordance with an embodiment of the present disclosure, the method includes recognizing the given pattern in the standby signal in a physical media attachment sub layer without needing to use a physical coding sub layer.

Additionally in accordance with an embodiment of the present disclosure, the method includes sending another given pattern in the physical layer of another in-band standby signal to the second device to activate a power saving mode in the second device.

Moreover, in accordance with an embodiment of the present disclosure, the method includes sending the wakeup signal in-band to the second device responsively to receiving the wakeup signal from the first device.

Further in accordance with an embodiment of the present disclosure the sending includes sending the wakeup signal to the second device prior to, or while, the retimer device is powering up from the power saving mode.

Still further in accordance with an embodiment of the present disclosure, the method includes generating another wakeup signal and sending the other wakeup signal in-band to the second device responsively to receiving the wakeup signal from the first device.

Additionally in accordance with an embodiment of the present disclosure the data link includes an electrical signal data link.

Moreover, in accordance with an embodiment of the present disclosure the data link includes an optical signal data link.

Further in accordance with an embodiment of the present disclosure the first device is an end device, and the second device is an end device.

Still further in accordance with an embodiment of the present disclosure the first device is a retimer device and the second device is an end device.

Additionally in accordance with an embodiment of the present disclosure the first device is an end device, and the second device is a retimer device.

Moreover, in accordance with an embodiment of the present disclosure the first device is a retimer device and the second device is a retimer device.

BRIEF DESCRIPTION OF THE DRAWINGS

The present invention will be understood from the following detailed description, taken in conjunction with the attached Annex and the drawings in which:

FIG. 2 is a flowchart including steps in a power-down method in the system of FIG. 1;

FIG. 3 is flowchart including steps in a power-up method in the system of FIG. 1;

DESCRIPTION OF EXAMPLE EMBODIMENTS

Overview

Figure 1:
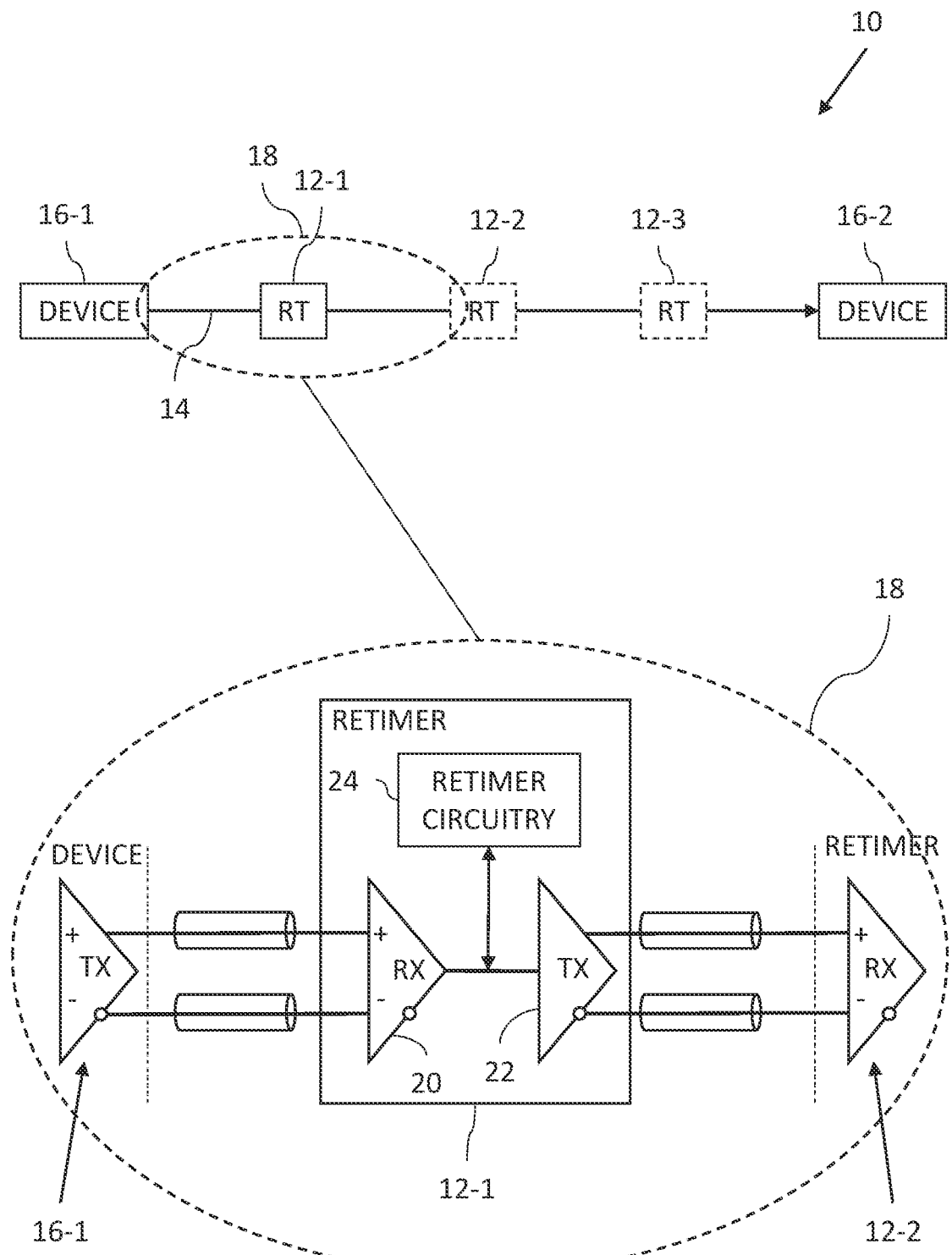
FIG. 1 is a block diagram view of a power state management system constructed and operative in accordance with an embodiment of the present invention.

As previously mentioned, power state management is used to save power in links between devices. For example, two devices either side of a passive link may perform a handshake to take both devices into a power saving mode to save energy when the link is not actively being used to transfer packets or other data.

When dealing with active links including such components as retimer devices, power saving management is more complex. A typical network/Ethernet retimer device is a mixed-signal analog/digital device that is not protocol aware and has the ability to recover a clock phase from a data stream, and prepare and retransmit a fresh copy of the data sampled by a clean clock, which is based on the recovered clock phase. The term "clean clock" as used in the specification and claims is defined to include a "recovered clock" recovered by a clock data recovery (CDR) function, which may compensate for phase-delay variations and jitter.

The retimer device may include a continuous time linear equalizer (CTLE), a variable gain amplifier (VGA), driver stages, a clock data recovery (CDR) circuit, a long-tail equalizer (LTE), and a decision feedback equalizer (DFE). The LTE compensates for long-term impulse response impairments, and the DFE acts as a nonlinear equalizer, suppressing the ISI due to channel imperfections such as high-frequency losses and notches. Internal digital logic, state machines, and/or a microcontroller may manage the automatic adaptation of the CTLE, VGA, LTE, and DFE blocks, and implement protocol link training and status updates.

One solution to allowing retimer devices to be placed in power saving mode is to have full physical coding sub-layer (PCS) state machines in each retimer device so that the retimer devices in the link can be placed in power saving mode via a handshake from one or more other devices at either end of the link. The above solution is impractical and adds too much complexity to the retimer devices as well as taking too long to power down and power up the retimer devices. Other solutions may include using out-of-band signaling to signal the retimer devices to enter and exit power saving mode.

Embodiments of the present invention solve at least some of the above problems by allowing a retimer device (or devices) in an active link between two end devices (e.g., host devices, chips or nodes, or any combination thereof) at either end of the link to be signaled using an in-band standby signal (sent from an end device or another retimer device) to place the retimer into a power saving mode and using an in-band wakeup signal (sent from the end device or another retimer device) to cause the retimer to exit from the power saving mode.

The in-band standby signal may include a pseudo-random pattern in the physical signal which is recognized by the retimer device. The given pattern may be recognized and processed by a physical media attachment (PMA) sub-layer without having to use PCS state machines. The receiving retimer device generally also synchronizes to, and locks on to the pseudo-random pattern in a noisy environment and/or when receiving the pattern from a noisy channel. The length of the pattern is generally sufficiently long to ensure that the pattern is unlikely to be falsely identified as part of resiliency to any potential bit flips or receiver impairments. Protecting against false identification may be important as the PMA sub-layer is generally not protected by a forward error correction (FEC) mechanism. The retimer device enters power saving mode upon receipt of the standby signal including the given pattern. Entering power saving mode may include powering down retimer circuitry such as circuitry used for retiming data, modulation, and equalization. The retimer device may then also transmit the given pattern in an in-band physical signal to the next electrical or optical device (e.g., retimer device or end device) in the link so that the next element may enter power saving mode, etc. in a cascaded fashion until all retimer devices along the link are in power saving mode.

Upon the retimer device(s) in the link entering power saving mode the link is maintained in zero differential, i.e., common mode on both p/n wires. For example, both wires of the link (p and n, if an electrical wire is used) are maintained at the same voltage. For an optical link, the optical link is maintained in common mode without modulation, for example.

When one of the end devices at either end of the link determines that the link should be brought out of power saving mode, the end device transmits an in-band wakeup signal to the first retimer device in the link. The wakeup signal may take the form of a specific signal or any signal which takes the link out of common mode or zero differential, for example, by providing a wakeup signal in a given frequency range and with a minimum differential swing. The wakeup signal could be a clock pattern or random pattern, for example. The wakeup signal is detected by a receiver of the first retimer device (e.g., based on the link exiting common mode) and causes the first retimer device to exit power saving mode and transmit a wakeup signal (e.g., the same received wakeup signal or a new wakeup signal) to the next device (e.g., retimer device or end device) in the link etc. in a cascaded fashion until all retimer devices along the link have exited power saving mode. The wakeup signal may be sent to the next device, prior to, or while, the first retimer device is exiting power save mode.

The above may be used to cause retimer devices to enter and exit power saving mode for electrically based links (e.g., copper wire or PCB trace links) or optical based links (e.g., using optical fibers).

System Description

Reference is now made to FIG. 1, which is a block diagram view of a power state management system 10 constructed and operative in accordance with an embodiment of the present invention. The power state management system 10 includes a plurality of retimer devices 12 on an active data link 14 between two end devices 16. One of the retimer devices 12, retimer device 12-1, is shown in an inset 18 of FIG. 1. Part of one of the end devices 16, an end device 16-1, and part of one of another one of the retimer devices 12, retimer device 12-2, are also shown in inset 18. The active data link 14 also includes a third retimer device 12-3. Three retimer devices 12 are shown by way of example only, the active data link 14 may include any suitable number of retimer devices 12, such as one, two, three or more retimer devices 12.

The retimer devices 12 are described in more detail by way of retimer device 12-1 shown in more detail in inset 18. The retimer devices 12-1 includes a receiver 20, a transmitter 22, and retimer circuitry 24.

In normal operation, the receiver 20 is configured to receive data (e.g., packets) from the end device 16-1 via the active data link 14. The retimer circuitry 24 is configured to recover a clock phase from the received data and prepare for transmission a new copy of the received data sampled by a clean version of the recovered clock phase. The transmitter 22 is configured to transmit the new copy of the received data to the retimer device 12-2 via the data link 14. If the active link 14 does not include the retimer devices 12-2, 12-3, then the transmitter 22 is configured to transmit the new copy of the received data to the end device 16-2. The active link 14 may include any suitable data link, for example, an electrical signal data link and/or an optical signal data link. Depending on the number of retimer devices 12 in the active data link 14 and the position of the retimer device 12-1 in the active data link 14, in other embodiments, the retimer device 12-1 may receive data from one of the end devices 16 or one of the retimer devices 12, and transmit data to one of the end devices 16 or one of the retimer devices 12.

Reference is now made to FIG. 2, which is a flowchart 200 including steps in a power-down method in the system 10 of FIG. 1. Reference is also made to FIG. 1. Entering power saving mode is now described in more detail.

The receiver 20 is configured to receive an in-band standby signal from the end device 16-1 (block 202). The standby signal has a given pattern in a physical layer of the standby signal. The receiver 20 is configured to activate a power saving mode (e.g., L1 power saving mode) of the retimer device 12-1 so that at least some of the retimer device 12-1 is powered down responsively to the standby signal having the given pattern in the physical layer of the standby signal (block 204). In some embodiments, the receiver 20 recognizes the given pattern in the standby signal in a physical media attachment (PMA) sub layer without needing to use a physical coding sublayer (PCS) state machine. In some embodiments, the receiver 20 is configured to activate a power saving mode of the retimer circuitry 24 so that the retimer circuitry 24 is powered down responsively to the in-band standby signal.

In some embodiments, the transmitter 22 is configured to send the same given pattern (as received by the receiver 20) in the physical layer of the same standby signal to the retimer device 12-2 (or to the end device 16-2 if the active data link 14 does not include the retimer devices 12-2, 12-3) to activate a power saving mode in the retimer device 12-2 (or to the end device 16-2 if the active data link 14 does not include the retimer devices 12-2, 12-3) (block 206).

In other embodiments, the transmitter 22 is configured to generate another standby signal and send another given pattern in the physical layer of the other in-band standby signal to the retimer device 12-2 (or to the end device 16-2 if the active data link 14 does not include the retimer devices 12-2, 12-3) to activate a power saving mode in the retimer device 12-2 (or to the end device 16-2 if the active data link 14 does not include the retimer devices 12-2, 12-3) (block 208).

The standby signal (or equivalent thereof) is propagated by each device to the next device in the active data link 14 in a cascaded fashion thereby causing each device in the active data link 14 to enter the power saving mode.

Reference is now made to FIG. 3, which is flowchart 300 including steps in a power-up method in the system 10 of FIG. 1. Reference is also made to FIG. 1. Exiting power saving mode is now described in more detail.

The receiver 20 is configured to receive an in-band wakeup signal from the end device 16-1 (block 302) and initiate an exit from the power saving mode to power up the retimer device 12-1 responsively to the wakeup signal (block 304). In some embodiments, the receiver 20 is configured to initiate an exit from the power saving mode to power up the retimer circuitry 24 responsively to the wakeup signal. The transmitter 22 is configured to send the wakeup signal in-band to the retimer device 12-2 (or to the end device 16-2 if the active data link 14 does not include the retimer devices 12-2, 12-3) responsively to receiving the wakeup signal from the end device 16-1 (block 306). The transmitter 22 is configured to send the wakeup signal to the retimer device 12-2 (or to the end device 16-2 if the active data link 14 does not include the retimer devices 12-2, 12-3) prior to, or while, the retimer device 12-1 is powering up from the power saving mode. In other embodiments, the transmitter 22 is configured to generate another wakeup signal (block 308) and send the other wakeup signal in-band to the retimer device 12-2 (or to the end device 16-2 if the active data link 14 does not include the retimer devices 12-2, 12-3) responsively to receiving the wakeup signal from the retimer device 12-1 (block 310).

The wakeup signal (or equivalent thereof) is propagated by each device to the next device in the active data link 14 in a cascaded fashion thereby causing each device in the active data link 14 to exit the power saving mode.

In practice, some or all of the functions of the receiver 20 and/or the transmitter 22 may be combined in a single physical component or, alternatively, implemented using multiple physical components. These physical components may comprise hard-wired or programmable devices, or a combination of the two. In some embodiments, at least some of the functions of the receiver 20 and/or the transmitter 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 4:
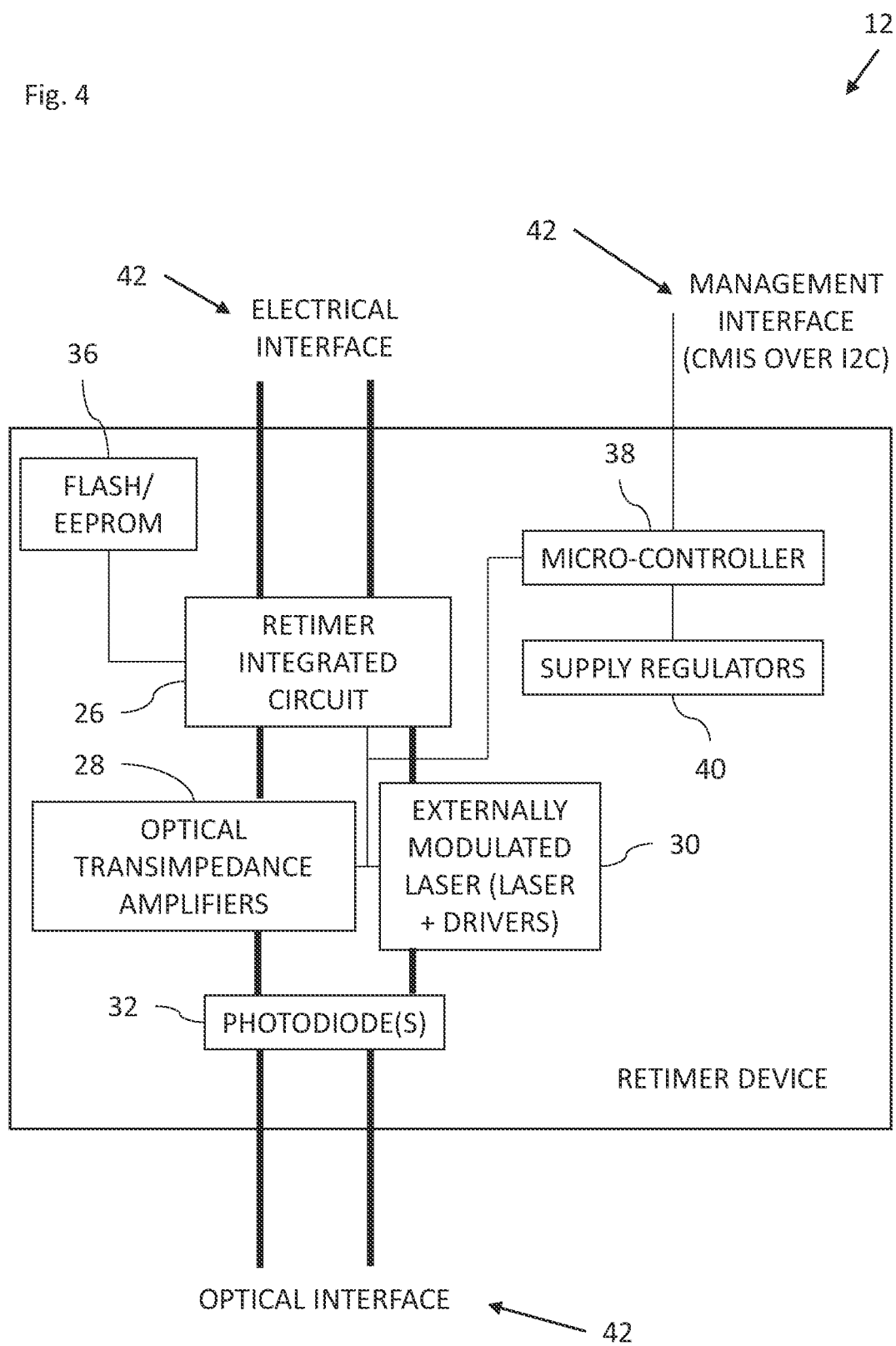
FIG. 4 is a block diagram view of a retimer device for use in the system of FIG. 1.
Figure 5:
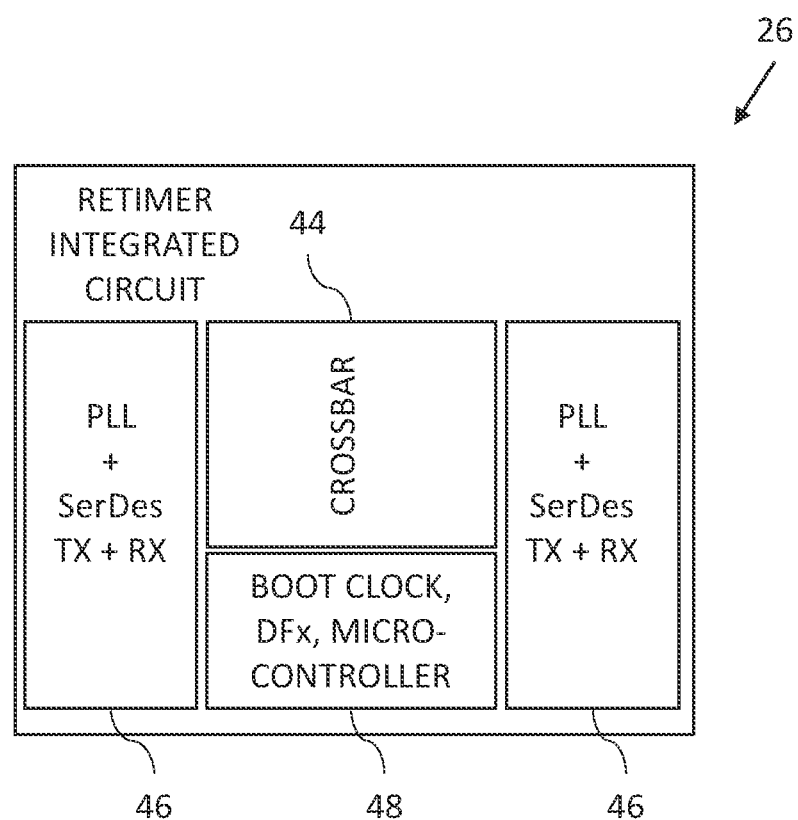
FIG. 5 is a block diagram of a retimer integrated circuit of the retimer device of FIG. 4.

Reference is now made to FIGS. 4 and 5. FIG. 4 is a block diagram view of an example retimer device, which may be one of the retimer devices 12 for use in the system 10 of FIG. 1. Other retimer devices may be used in the system 10. FIG. 5 is a block diagram of an example retimer integrated circuit 26 of the retimer device 12 of FIG. 4. FIGS. 4 and 5 shows various elements of the retimer device 12. The retimer devices 12 includes the retimer integrated circuit 26, optical transimpedance amplifiers 28, an externally modulated laser 30, one or more photodiodes 32, flash or EEPROM memory 36, a micro-controller 38, supply regulators 40, and interfaces 42. In non-optical retimer devices optical-specific elements are typically missing.

Most of the power saving in the retimer device 12 is in the retimer integrated circuit 26 shown in more detail in FIG. 5. The retimer integrated circuit 26 includes a crossbar 44, a Serializer/Deserializer (SerDes) and phase-locked loop (PLL) 46, a boot clock, DFx (a term used to describe an optional component to perform a function x, such as debugging or testing), and a micro-controller 48. During power saving mode a majority of the circuitry of the crossbar 44, PLL and SerDes 46 are powered down saving around 80-95% of the power used by the retimer device. Enough of the circuitry of the retimer integrated circuit 44 is left powered up in order to allow the retimer device 12 to detect the wakeup signal described in more detail above and optionally send a wakeup signal to another device on the active data link 14.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A retimer device, comprising:
a receiver to receive data from a first device via a data link;
retimer circuitry to:
recover a clock phase from the received data; and
prepare for transmission a new copy of the received data sampled by a clean clock based on the recovered clock phase; and
a transmitter to transmit the new copy of the received data to a second device via the data link,
wherein the receiver is configured to:
receive an in-band standby signal from the first device having a given pattern in a physical layer of the signal;
activate a power saving mode of the retimer device so that at least some of the retimer circuitry is powered down responsively to the standby signal having the given pattern in the physical layer of the standby signal;
receive an in-band wakeup signal from the first device; and
initiate an exit from the power saving mode to power up the retimer device responsively to the wakeup signal.

2. The device according to claim 1, wherein the receiver is configured to:
activate the power saving mode of the retimer circuitry so that the retimer circuitry is powered down responsively to the in-band standby signal; and
initiate an exit from the power saving mode to power up the retimer circuitry responsively to the wakeup signal.

3. The device according to claim 1, wherein the receiver recognizes the given pattern in the standby signal in a physical media attachment sub layer without needing to use a physical coding sub layer.

4. The device according to claim 1, wherein the transmitter is configured to send another given pattern in the physical layer of another in-band standby signal to the second device to activate a power saving mode in the second device.

5. The device according to claim 1, wherein the transmitter is configured to send the wakeup signal in-band to the second device responsively to receiving the wakeup signal from the first device.

6. The device according to claim 5, wherein the transmitter is configured to send the wakeup signal to the second device prior to, or while, the retimer device is powering up from the power saving mode.

7. The device according to claim 1, wherein the transmitter is configured to generate another wakeup signal and send the other wakeup signal in-band to the second device responsively to receiving the wakeup signal from the first device.

8. The device according to claim 1, wherein the data link includes an electrical signal data link.

9. The device according to claim 1, wherein the data link includes an optical signal data link.

10. The device according to claim 1, wherein the first device is an end device, and the second device is an end device.

11. The device according to claim 1, wherein the first device is a retimer device and the second device is an end device.

12. The device according to claim 1, wherein the first device is an end device, and the second device is a retimer device.

13. The device according to claim 1, wherein the first device is a retimer device and the second device is a retimer device.

14. A retimer device power saving mode method, comprising:
receiving data from a first device via a data link;
recovering a clock phase from the received data;
preparing for transmission a new copy of the received data sampled by a clean clock based on the recovered clock phase;
transmitting the new copy of the received data to a second device via the data link;
receiving an in-band standby signal from the first device having a given pattern in a physical layer of the signal;

activating a power saving mode of a retimer device so that at least some of the retimer circuitry is powered down responsively to the standby signal having the given pattern in the physical layer of the standby signal;

receiving an in-band wakeup signal from the first device; and initiating an exit from the power saving mode to power up the retimer device responsively to the wakeup signal.

15. The method according to claim 14, wherein:

the activating includes activating the power saving mode of retimer circuitry so that the retimer circuitry is powered down responsively to the in-band standby signal; and initiating an exit from the power saving mode to power up the retimer circuitry responsively to the wakeup signal.

16. The method according to claim 14, further comprising recognizing the given pattern in the standby signal in a physical media attachment sub layer without needing to use a physical coding sub layer.

17. The method according to claim 14, further comprising sending another given pattern in the physical layer of another in-band standby signal to the second device to activate a power saving mode in the second device.

18. The method according to claim 14, further comprising sending the wakeup signal in-band to the second device responsively to receiving the wakeup signal from the first device.

19. The method according to claim 18, wherein the sending includes sending the wakeup signal to the second device prior to, or while, the retimer device is powering up from the power saving mode.

20. The method according to claim 14, further comprising generating another wakeup signal and sending the other wakeup signal in-band to the second device responsively to receiving the wakeup signal from the first device.

21. The method according to claim 14, wherein the data link includes an electrical signal data link.

22. The method according to claim 14, wherein the data link includes an optical signal data link.

23. The method according to claim 14, wherein the first device is an end device, and the second device is an end device.

24. The method according to claim 14, wherein the first device is a retimer device and the second device is an end device.

25. The method according to claim 14, wherein the first device is an end device, and the second device is a retimer device.

26. The method according to claim 14, wherein the first device is a retimer device and the second device is a retimer device.

* * * * *